United States Patent
Emens et al.

(10) Patent No.: US 6,493,744 B1
(45) Date of Patent: Dec. 10, 2002

(54) AUTOMATIC RATING AND FILTERING OF DATA FILES FOR OBJECTIONABLE CONTENT

(75) Inventors: Michael Lawrence Emens, San Jose, CA (US); Reiner Kraft, Gilroy, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,644

(22) Filed: Aug. 16, 1999

(51) Int. Cl.[7] ............................................. G06F 15/16
(52) U.S. Cl. ..................... 709/203; 709/228; 709/229; 707/1; 707/9; 707/10; 725/28; 386/69
(58) Field of Search ................................ 709/203, 228, 709/229; 707/1, 9, 10; 725/28; 386/69

(56) References Cited

U.S. PATENT DOCUMENTS

| | | | |
|---|---|---|---|
| 3,553,372 A | 1/1971 | Wright et al. ................. | 179/1 |
| 4,069,393 A | 1/1978 | Martin et al. .................. | 179/1 |
| 4,087,632 A | 5/1978 | Hafer ............................. | 179/1 |
| 4,624,010 A | 11/1986 | Takebayashu ................ | 381/43 |
| 5,151,940 A | 9/1992 | Okazaki et al. ............... | 381/43 |
| 5,678,041 A | 10/1997 | Baker et al. ................. | 395/609 |
| 5,706,507 A | 1/1998 | Schloss ........................ | 395/615 |
| 5,754,978 A | 5/1998 | Perez-Mendez et al. .... | 704/255 |
| 5,835,722 A | 11/1998 | Bradshaw et al. ..... | 395/200.55 |
| 5,878,233 A | 3/1999 | Schloss ................. | 395/200.55 |
| 5,911,043 A | 6/1999 | Duffy et al. ........... | 395/200.33 |

*Primary Examiner*—Dung C. Dinh
*Assistant Examiner*—Hien Le
(74) *Attorney, Agent, or Firm*—Lumen Intellectual Property Services, Inc.

(57) ABSTRACT

An automatic method for rating data files for objectionable content in a distributed computer system includes preprocessing the file to create semantic units, comparing the semantic units with a rating repository containing entries and associated ratings, assigning content rating vectors to the semantic units, and creating a modified data file incorporating rating information derived from the content rating vectors. For text files, the semantic units are words or phrases, and the rating repository also contains words or phrases with corresponding content rating vectors. For audio files, the file is first converted to a text file using voice recognition software. For image files, image processing software is used to recognize individual objects and compare them to basic images and ratings stored in the rating repository. In one embodiment, a composite content rating vector is derived for the file from the individual content rating vectors, and the composite content rating vector is incorporated into the modified file. In an alternate embodiment, semantic units with content rating vectors exceeding preset user limit values of objectionable content are blocked out by display blocks or, for audio, audio blanking signals, for example, beeps. The user can then view or hear the remaining portions of the file. The invention can be used with any type of data file that can be divided into semantic units, and can be implemented in a server, client, search engine, or proxy server.

44 Claims, 9 Drawing Sheets

AUTOMATIC RATING AND FILTERING OF DATA FILES FOR OBJECTIONABLE CONTENT

FIELD OF THE INVENTION

This invention relates generally to methods for rating data for objectionable content. More particularly, it relates to methods for automatically rating and filtering objectionable data on Web pages.

BACKGROUND ART

The astronomical growth of the World Wide Web in the last decade has put a wide variety of information at the fingertips of anyone with access to a computer connected to the internet. In particular, parents and teachers have found the internet to be a rich educational tool for children, allowing them to conduct research that would in the past have either been impossible or taken far too long to be feasible. In addition to valuable information, however, children also have access to offensive or inappropriate information, including violence, pornography, and hate-motivated speech. Because the World Wide Web is inherently a forum for unrestricted content from any source, censoring material that some find objectionable is an unacceptable solution.

Voluntary user-based solutions have been developed for implementation with a Web browser on a client computer. The browser determines whether or not to display a document by applying a set of user-specified criteria. For example, the browser may have access to a list of excluded sites or included sites, provided by a commercial service or a parent or educator. Users can also choose to receive documents only through a Web proxy server, which compares the requested document with an exclusion or inclusion list before sending it to the client computer. Because new content is continually being added to the World Wide Web, however, it is virtually impossible to maintain a current list of inappropriate sites. Limiting the user to a list of included sites might be appropriate for corporate environments, but not for educational ones in which the internet is used for research purposes.

The Recreational Software Advisory Council (RSAC) has developed an objective content rating labeling system for Web sites, called RSAC on the Internet (RSACi). The system produces ratings tags that are compliant with the Platform for Internet Content Selection (PICS) tag system already in place, and that can easily be incorporated into existing HTML documents. The RSACi labels rate content on a scale of zero to four in four categories: violence, nudity, sex, and language. Current Web browsers are designed to read the RSACi tags and determine whether or not to display the document based on content levels the user sets for each of the four categories. The user can also set the browser not to display pages without a rating.

While a good beginning, there are three significant limitations to the RSACi rating system. First, it is a voluntary system and is effective only if widely implemented. There is somewhat of an incentive for the site creator to assign a rating, even if a zero rating, because some users choose not to display sites without a rating. If the site's creator does not include a rating, it can be generated by an outside source. However, the rate at which content is being added to the Web makes it virtually impossible for a third party to rate every new Web site manually.

Second, while the RSACi rating aims to be objective, it is subject to some amount of discretion of the person doing the rating. At its Web site (http://www.rsac.org), RSAC provides a detailed questionnaire for providing the rating, but the user can easily override or adjust the results.

Finally, there is currently no way to rate dynamically created documents. For example, search engines receive a user query, find applicable documents, and create a search result page listing a number of the located documents. The search result page typically includes a title and short abstract or extract, along with the URL, for each retrieved document. The result page itself might have objectionable content, and currently the only way to address this problem is for browsers not to display search result pages at all. Without search engines, though, internet research is significantly limited.

A further problem with all of the above solutions, as well as with word-screening or phrasescreening systems, is that they either allow or deny access to Web pages. Even if only a small portion of the document is objectionable, the user is prohibited from seeing the entire document. This is especially significant in search result pages, in which one offensive site prevents display of all of other unrelated sites.

The situation becomes even more complex when Web pages include non-text data, for example, audio or images. Surrounding text does not always indicate the content of the embedded file, allowing offensive audio or image material to slip through the ratings system. Occasionally, people deliberately mislabel offensive audio or image files in order to mislead monitoring services.

There is a need, therefore, for an automatic rating method for all material available on the World Wide Web, including dynamically created material, that allows greater viewer control over what material is displayed or blocked.

OBJECTS AND ADVANTAGES

Accordingly, it is a primary object of the present invention to provide a method for automatically rating a data file, for example, a Web page, for objectionable content.

It is an additional object of the invention to provide an objective rating method that requires no subjective human input after the system is initially devised.

It is a further object of the present invention to provide a method for automatically rating dynamically created documents as they are being created.

It is a yet another object of the present invention to provide a rating and filtering method that blocks objectionable content of a file while allowing access to remaining inoffensive portions of the file.

It is an additional object of the present invention to provide a method that can be used with any type of data file, including text, audio, and image.

It is a further object to provide a method for rating and filtering data files that can be implemented on a client, server, or proxy server, and can therefore be easily incorporated into existing system architectures.

Finally, it is an object of the present invention to provide an automatic rating method that works with existing manual rating methods and requires minimal system changes.

SUMMARY

These objects and advantages are attained by a computer-implemented method for rating a raw data file for objectionable content. The method occurs in a distributed computer system and comprises the steps of preprocessing the raw data file to create semantic units representative of the semantic content of the raw data file, comparing the semantic units with a rating repository comprising semantic entries and corresponding ratings, assigning content rating vectors to the semantic units, and creating a modified data file incorporating rating information derived from the content rating vectors. After the modified data file is created, either all, some, or none of the file will be displayed by a browser to a user at a client computer.

The method works with any type of data file that can be converted to semantic units. Embodiments of the preprocessing step vary with the type of raw data file to be rated. In one embodiment, a text-only HTML document is stripped of its tags and is then parsed into semantic units, for example, words or phrases. In an alternate embodiment, the data file is an audio file, and text data is created from the audio file using standard voice recognition software. The system also creates an audio-to-text correlation between a location in the created text data and a corresponding location in the audio file. The text file is then parsed into semantic units. In a further embodiment, image processing software is used to identify semantic units within an image file. The semantic units of an image file are discrete objects in regions within the image file.

The rating repository used depends on the type of file and related semantic units. For text files, the repository contains entries of words or phrases with corresponding content rating vectors. Each word entry in the repository may have numerous associated content rating vectors for different contexts in which the word is used, determined by surrounding words in the text. Audio files use a similar rating repository, but may include additional entries for sounds. The entries for image files are discrete objects that can be identified by the image processing software. Each discrete object has one or more content rating vectors associated with it. To assign content rating vectors to semantic units, the system first searches the rating repository for an entry equivalent to the semantic unit. If it finds no such entry, it assigns the semantic unit a zero content rating vector. If it does find an entry, it assigns the semantic unit the entry's corresponding content rating vector. If the entry has numerous content rating vectors, it analyzes surrounding semantic units to determine the appropriate context before assigning a content rating vector.

In a first preferred embodiment of the invention, a composite content rating vector, comprising a set of components, is derived from the content rating vectors. Each component of the composite content rating vector is derived from corresponding components of the content rating vectors. In one embodiment, each component of the composite content rating vector is a weighted average of the corresponding components of the content rating vectors, wherein the weighted average uses weighting factors related to the value of the components of the content rating vectors. In an alternate embodiment, each component of the composite content rating vector is equal to a selected value of the corresponding components of the content rating vectors. The selected value is the highest of the corresponding components and has at least a predetermined minimum number of occurrences. Many other methods for deriving the composite content rating vector can be used. The composite content rating vector is combined with the raw data file to produce a modified data file containing the composite content rating vector.

In a second preferred embodiment, termed filtering, the content rating vectors are compared with preset user limit values that define objectionable content rating vectors to identify objectionable semantic units. Objectionable content corresponding to the identified objectionable semantic units are then replaced by display blocks in a copy of the raw data file to produce a modified date file. Filtering can be performed on files including text, audio, or image. In a text-only data file, objectionable words or phrases are replaced with, for example, spaces, black rectangles, or a predetermined phrase. In an audio file, objectionable portions that correspond to the objectionable semantic units are located using the audio-to-text correlation. The objectionable portions are replaced with audio blanking signals, for example a tone or silent space, in a copy of the audio file to produce a modified audio file. Similarly, objectionable discrete objects of image files are identified by comparing content rating vectors with present user limit values. Content corresponding to the objectionable discrete object is replaced by image blocks, which may be black rectangles or blurred regions. In an alternate embodiment of the invention, after the objectionable content is replaced, the system derives a modified composite content rating vector for the modified data file from a modified set of content rating vectors. The modified set of content rating vectors does not contain content rating vectors corresponding to the objectionable semantic units.

The method can be implemented using many different architectures. In all architectures, the raw data file is stored in a server and the preset user limit values are stored in a client. All embodiments of the method can be implemented in a server, proxy server, or client. As is necessary, the server or proxy server obtains the preset user limit values from the client, and the proxy server and client obtain the raw data file from the server.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
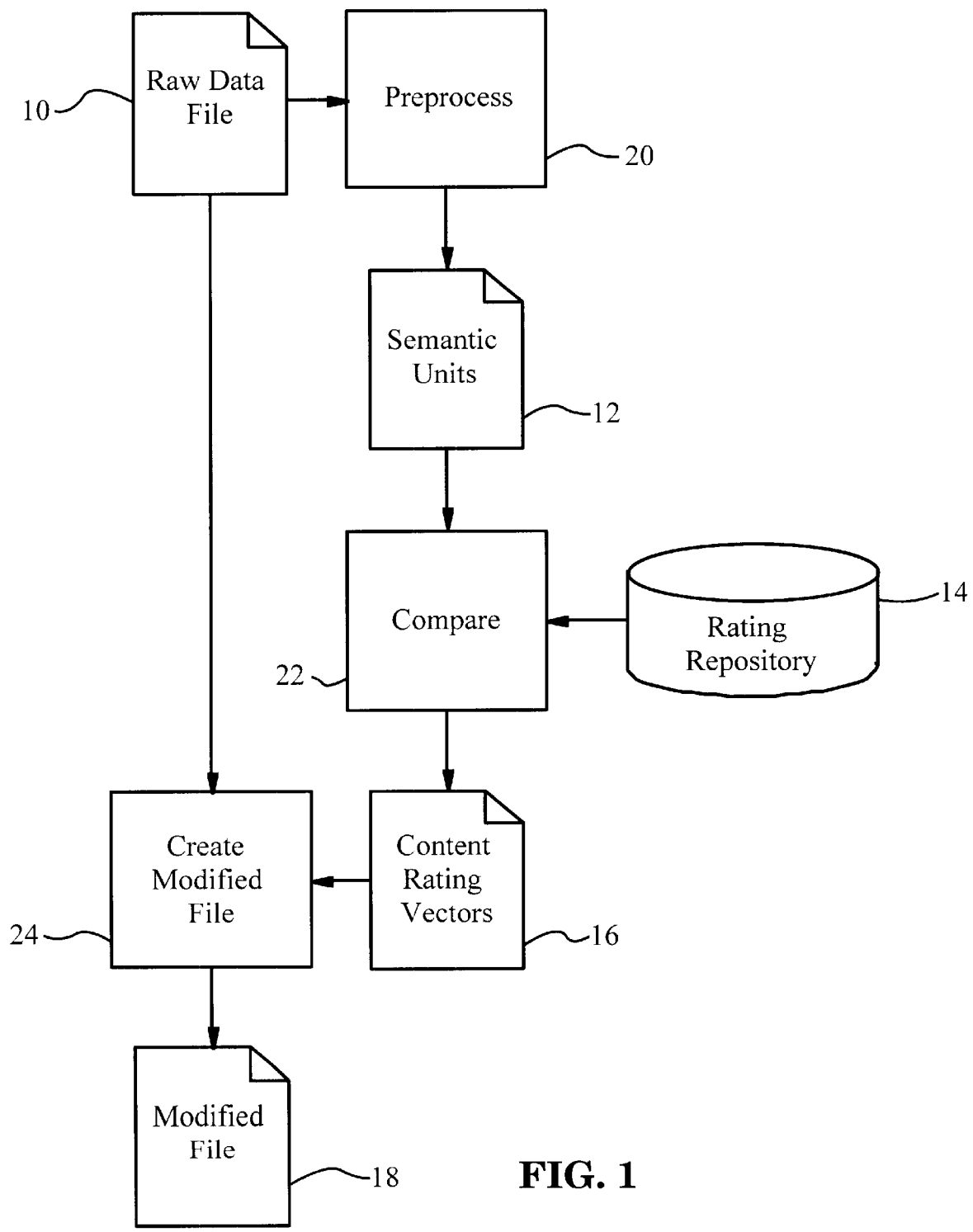
FIG. 1 is a block diagram of the rating method of the present invention.

A block diagram illustrating the operation of a preferred embodiment of the present invention is shown in FIG. 1. The method is typically carried out within a distributed computer system and includes a series of steps for automatically rating a raw data file for objectionable content. The rating can be used to derive an overall content rating for the file, or to selectively filter content from the document. In the first step, a raw data file 10 is preprocessed to generate semantic units 12, which can be words, phrases, parts of an image, or other such units representative of the semantic content of raw data file 10. Semantic units 12 are then compared with a rating repository 14, which contains entries related to the semantic units and content rating vectors (CRVs) associated with each entry. Content rating vectors 16 are assigned to the semantic units based on the comparison, and, in the final step, the system creates a modified data file 18 incorporating information derived from CRVs 16. Modified data file 18 can be an additional file created from a copy of raw data file 10, or it can be created from and replace the raw data file. Thus, the method includes a preprocessing step 20, a comparison step 22, an assigning step, and a modified file creation step 24.

The raw data file can be a file in any database, but in the preferred embodiment, it is a hypermedia file such as HTML text, a sound file, or an image file. Preprocessing step 20 varies with the type of file. For an HTML text file, the text is parsed into individual words or phrases using methods known in the art. Any tags or document meta-information, which are not displayed to the user, are ignored when the semantic units are created.

Figure 2A:
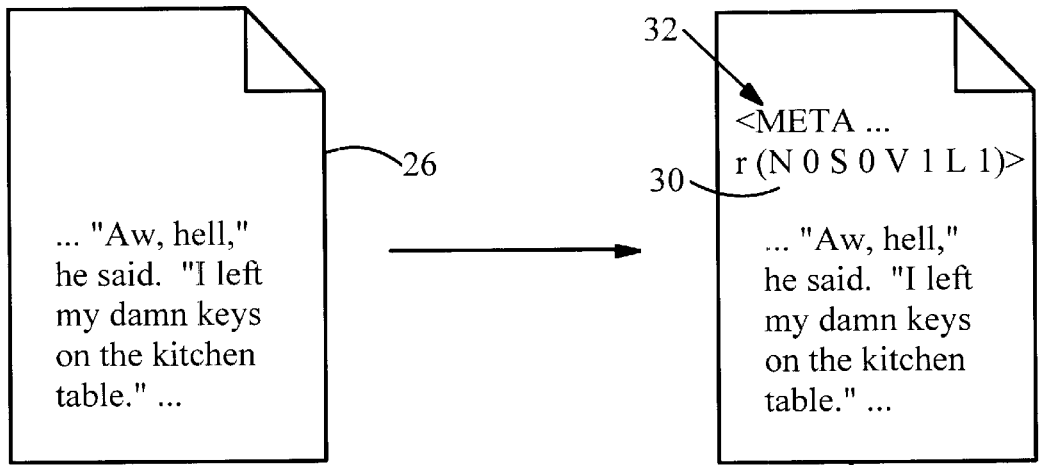
FIG. 2A is a schematic diagram of a raw data file and modified data file produced by composite rating.
Figure 2B:
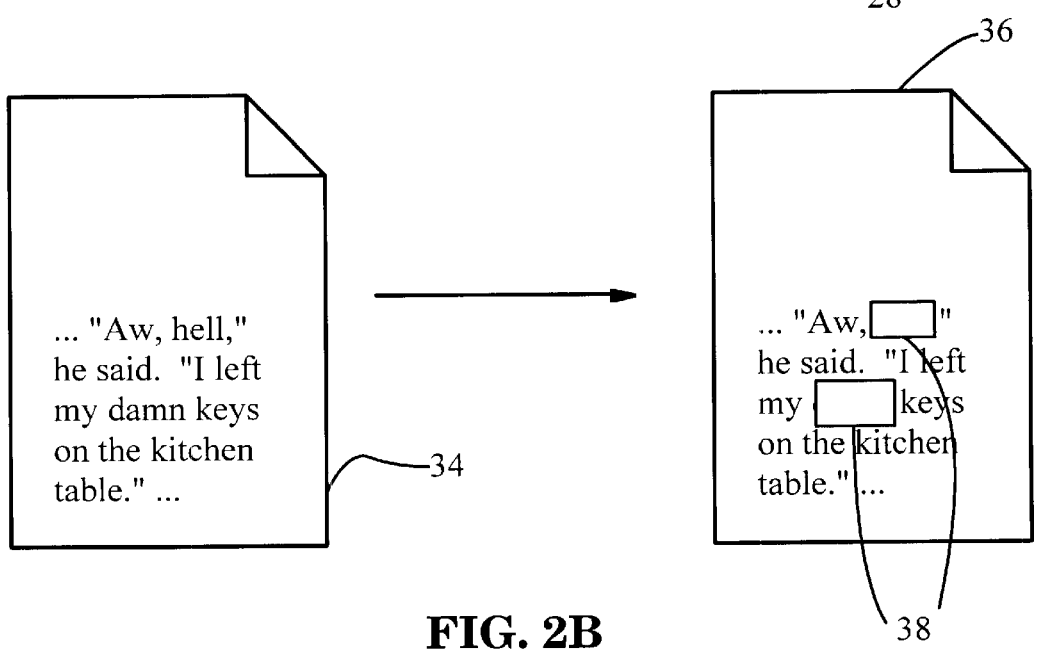
FIG. 2B is a schematic diagram of a raw data file and modified data file produced by filtering.
Figure 2C:
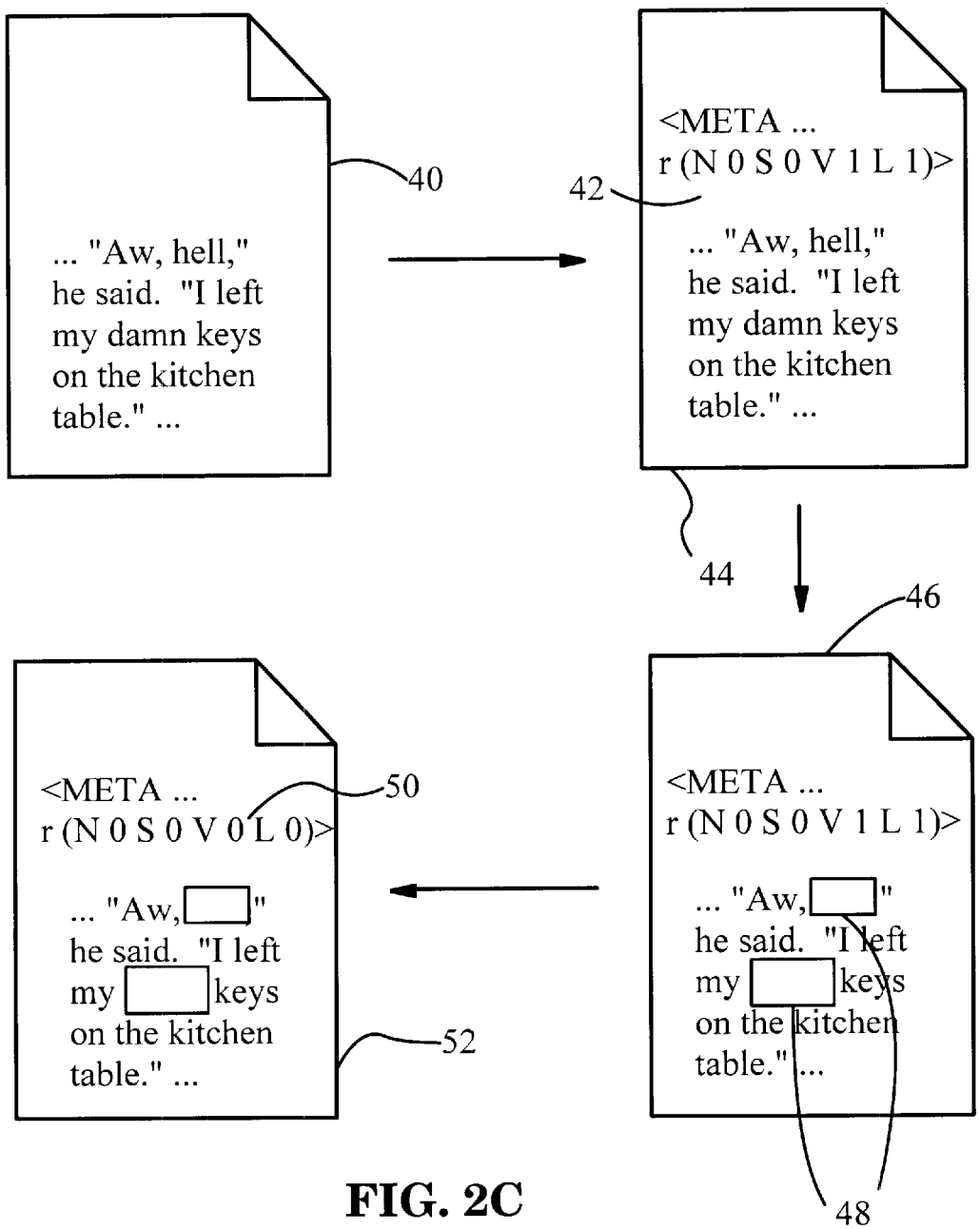
FIG. 2C is a schematic diagram of a raw data file and modified data file produced by composite rating and filtering.

Different embodiments of a modified text data file formed in modified file creation step 24 are displayed in FIGS. 2A–2C. In FIG. 2A, a raw data file 26 is combined with a composite content rating vector (CCRV) 30 for the file to create a modified data file 28. CCRV 30 is derived from the CRVs for each semantic unit. Specifically, CCRV 30 comprises a set of components, and each component is derived from corresponding components of the CRVs. CCRV 30 is added to the document as is currently done for manual CRVs—it is contained in a standard PICS tag 32 for document meta-information that is inserted into the header of an HTML document. A browser or server then extracts CCRV 30 from tag 32. Any reasonable method for deriving the CCRV may by used, and examples are discussed below. This embodiment of the method is called composite rating.

In an alternate embodiment of the modified file creation step shown in FIG. 2B, termed filtering, the CRVs are used to block specific semantic units. Semantic units of raw data file 34 are compared with the rating repository to obtain CRVs. The system reads preset user limit values, or content settings, defining objectionable CRVs, and compares the CRVs with the preset user limit values to identify objectionable semantic units. If one component of a semantic unit's CRV is above the corresponding preset user limit value, the semantic unit is considered objectionable. Objectionable content corresponding to objectionable semantic units is replaced by a display block or placeholder 38 in modified file 36. For text files, display block 38 may be spaces, a black rectangle, or a phrase indicating the type of content replaced, for example, "<offensive language>" or "<explicit sexual content>." Raw data file 34 is not altered; only modified file 36, which is created dynamically in response to the user limit values, is changed. The content settings are generally stored in a client browser. If the filtering method is performed in a different location in the distributed computer system, the browser either sends the settings or makes them accessible to the other computer.

These two embodiments can be combined in a number of ways, depending upon where in the distributed system each step is performed. In the example of FIG. 2C, raw data file 40 first receives a CCRV 42, stored in first modified data file 44. If CCRV 42 is above the user limit, in which case the browser does not display first modified file 44, first modified file 44 is then filtered using preset user limit values to produce second modified file 46 containing display blocks 48. CRVs corresponding to the objectionable semantic units are deleted to form a modified set of CRVs, and a modified CCRV 50 is derived. CCRV 42 is replaced by modified CCRV 50 in second modified file 46 to produce third modified file 52. The browser extracts modified CCRV 50, which is necessarily below the preset user limit values, and displays third modified file 52. While not explicitly stated, various other permutations of composite rating and filtering will be obvious to someone skilled in the art upon reading this description, and are therefore included in the method of the present invention.

Figure 3:
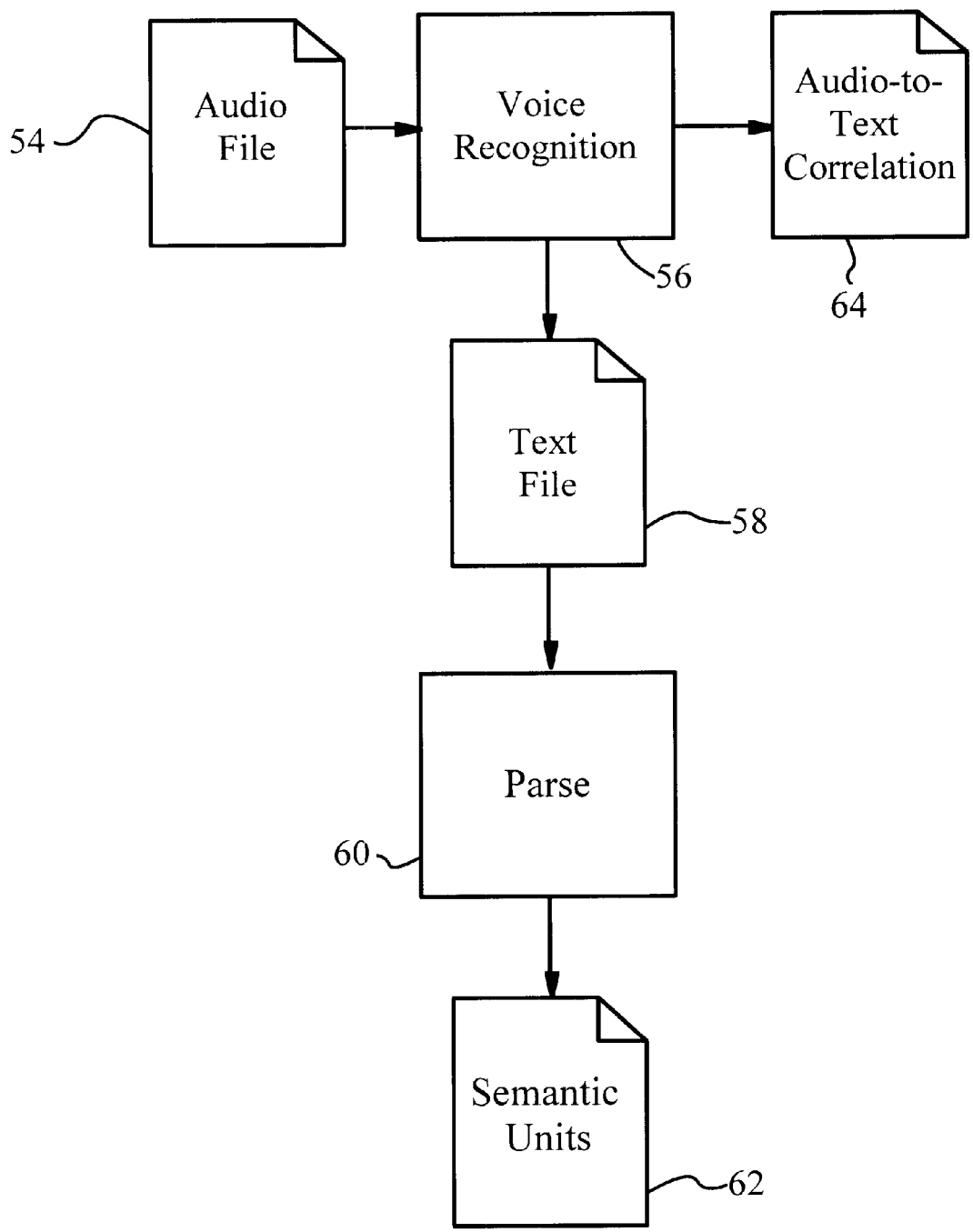
FIG. 3 is a schematic diagram of a preprocessing step for an audio file.

Non-text data files are easily accommodated by alternate embodiments of the automatic rating method. Standard voice recognition software is used to preprocess audio files, as shown in FIG. 3. Voice recognition software is commonly available; one product is IBM ViaVoice. An audio file 54 is converted in voice recognition step 56 into text data 58. Text data 58 is then parsed in step 60 into semantic units 62, words or phrases, and treated as with the text files described above. During the preprocessing step, an audio-to-text correlation 64 between locations in the text file and corresponding locations in the audio file is created. Audio-to-text correlation 64 is needed to filter audio file 54 (not shown). Objectionable portions of the audio file corresponding to objectionable semantic units, identified in a comparison of CRVs with preset user limit values, are located using audio-to-text correlation 64. Just as words or phrases are blocked out of a text file, portions of the audio file containing objectionable words or phrases can be replaced with audio blanking signals to create a modified audio file. These audio blanking signals can be audio tones, beeps, silent portions, or spoken phrases describing the missing material. Removed portions do not necessarily need to be words. Audio files can also contain sexual or violent sounds, for example, heavy breathing or gunshots. As audio processing technology develops and more sounds can be identified, the sounds can be similarly removed from the modified audio files. The semantic units relating to the sounds might be descriptive words or codes that are also included in the repository database.

In an alternate embodiment for image files, image processing software is used in the preprocessing step to recognize discrete objects in regions within an image file. These discrete objects are the semantic units, which are then assigned content rating vectors. Software systems use techniques known in the art, including filters, shape-based indexing, and matching using Daubechies' Wavelets, to identify the discrete objects. The repository stores basic images of discrete objects that can be recognized by these software systems. In the filtering embodiment of the method, objectionable regions of the image file are replaced by image blocks, which may be black rectangles. The image blocks can also be formed by blurring regions of the file to make them unrecognizable. The method of the present invention can be used to rate or filter any type of raw data file, including multimedia files. Appropriate semantic units and rating repositories can be easily determined by those skilled in the art.

Any content rating scheme may be used for devising CRVs, depending upon the type of information the user wishes to be alerted of. The preferred embodiment uses the RSAC on the Internet (RSACi) system developed by the Recreational Software Advisory Council (RSAC), available at the RSAC Web site at http://www.rsac.org. This standard has already been developed and is supported by most Web browsers. The RSACi system provides content ratings on a scale of zero to four in four categories: nudity, sex, violence, and language. Each category is a component of the CRV; a typical CRV is (N 1 S 0 V 2 L 3). In the preferred embodiment, the present invention assigns an RSACi CRV to each semantic unit.

One goal of the present invention is to create an objective ratings system. While no system is completely objective, the present method aims to place the subjectivity in the hands of the parent selecting the allowable levels. For example, an RSACi language level of two corresponds to "moderate expletives or profanity." Based on the RSACi definition of moderate, the parent sets the browser ratings accordingly. In the present invention, the objectivity is implemented in the ratings repository and its use in assigning CRVs to semantic units. The ratings repository is created by a person who selects the entries and defines an associated CRV for each entry. The entries can be words, phrases, sounds, or images, and are correlated with the algorithm used to assign the rating. Some words are objectionable only in certain contexts, and their entry in the repository can include ratings for various contexts. For example, consider the word "stab." When used in the phrase "take a stab at it," the word is harmless and receives a violence rating of zero. However, it can also be used in an explicitly violent passage to describe one person stabbing another with a knife. In that case, the word or phrase in which it is included might receive a violence rating of three for "aggressive violence or death to humans." Other words are mild when used alone, but become offensive in certain combinations, which may not necessarily be standard phrases. Consider the words "body," "hot," and "lick." One can imagine their use in pornographic writing in various combinations, and the close proximity of the three words necessitates a high rating in the sex category. However, proximity is not always enough to determine the rating. Consider the following sentence: "It was a very hot day, so every body got an ice cream cone to lick." In this example, the words receive a zero sex rating, which may be determined by the use of "hot" to modify "day," or the presence of "ice cream cone." For each word entry, therefore, the repository might include a basic rating, a list of phrases in which the word can occur, with corresponding ratings for the phrase, or a list of words in the surrounding text that determine the appropriate rating for the word.

For a given rating repository, there are numerous methods for deriving the components of a CCRV from corresponding components of the CRVs for each semantic unit. Consider a small file with only ten semantic units. One of the content rating categories, language, has the following corresponding components of the CRVs: (0, 1, 0, 0, 1, 2, 0, 0, 3, 4). The average of these number is 1.1, clearly not a reasonable language component of the CCRV. In one embodiment, each component of the CCRV is a weighted average of corresponding components of CRVs, in which corresponding components of CRVs are multiplied by weighting factors relating to values of the components. The 4 in the example above has the highest weighting factor, in order to skew the component of the CCRV much higher than the average.

In another embodiment, each component of the CCRV is equal to a selected value of the corresponding components of the CRVs. The selected value is the highest value that has at least a predetermined minimum of occurrences. If the predetermined minimum number of occurrences is one, in the example above, the language component of the CCRV is 4. A slight modification of this embodiment counts an occurrence when the number or a higher number occurs. For example, 2 or higher has three occurrences. For a predetermined minimum number of occurrences of two, 3 or higher is the highest corresponding component of the CRVs meeting this requirement, and the entire file receives a composite language rating of 3. In an additional modification, the predetermined minimum number of occurrences can vary for each value. For example, a predetermined minimum number of occurrences of one for component 4 causes a composite rating of 4, but if 3 is the highest rating, it must occur in two of the occurrences for the file to receive a composite rating of 3. The predetermined minimum number of occurrences is more likely a percentage of the total number of CRVs. Appropriate rules can be developed through standard statistical analyses comparing manually derived CRVs for an entire file with CRVs for the file's semantic units.

Additional embodiments of the invention correspond to implementations of the method in different components of the distributed computer system. The following examples are intended to illustrate, but not limit, potential embodiments of the present invention.

EXAMPLE 1

SERVER COMPOSITE RATES

Figure 4A:
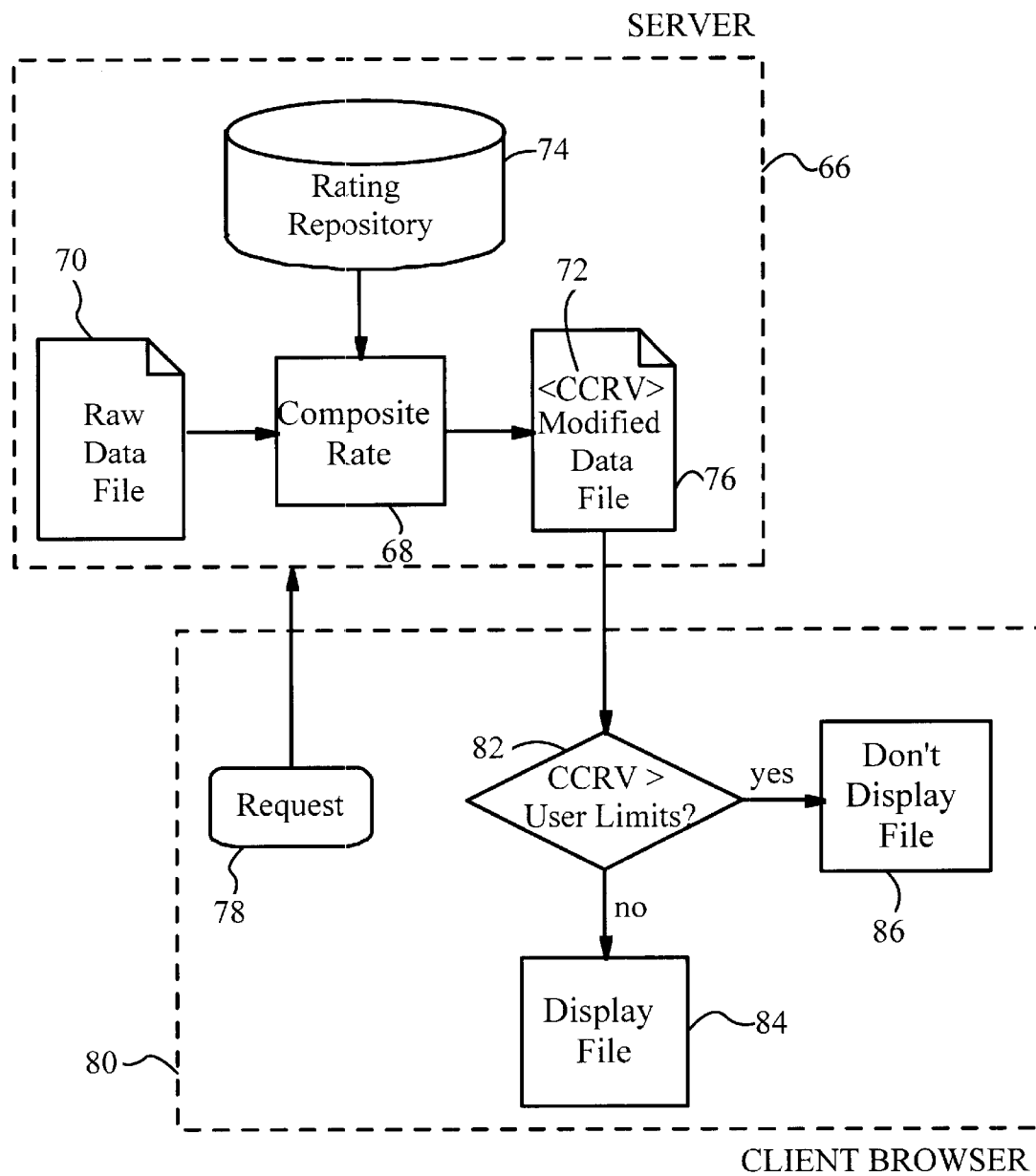
FIG. 4A is a schematic diagram of a system architecture implementing the present invention in a server.

As shown in FIG. 4A, a server 66 implements a composite rating step 68 in batch mode. Periodically, it searches for and finds an unrated raw data file 70 and derives a CCRV 72 for it, based on a rating repository 74 either within server 66 or in a different computer. It then adds a rating tag to the file to create a modified file 76. When it receives a request 78 from a client browser 80, server 66 sends modified file 76. In comparison step 82, client browser 80 compares CCRV 72 with the preset user limit values to determine whether to display the file, step 84, or not display it, step 86.

EXAMPLE 2

PROXY SERVER COMPOSITE RATES

Figure 4B:
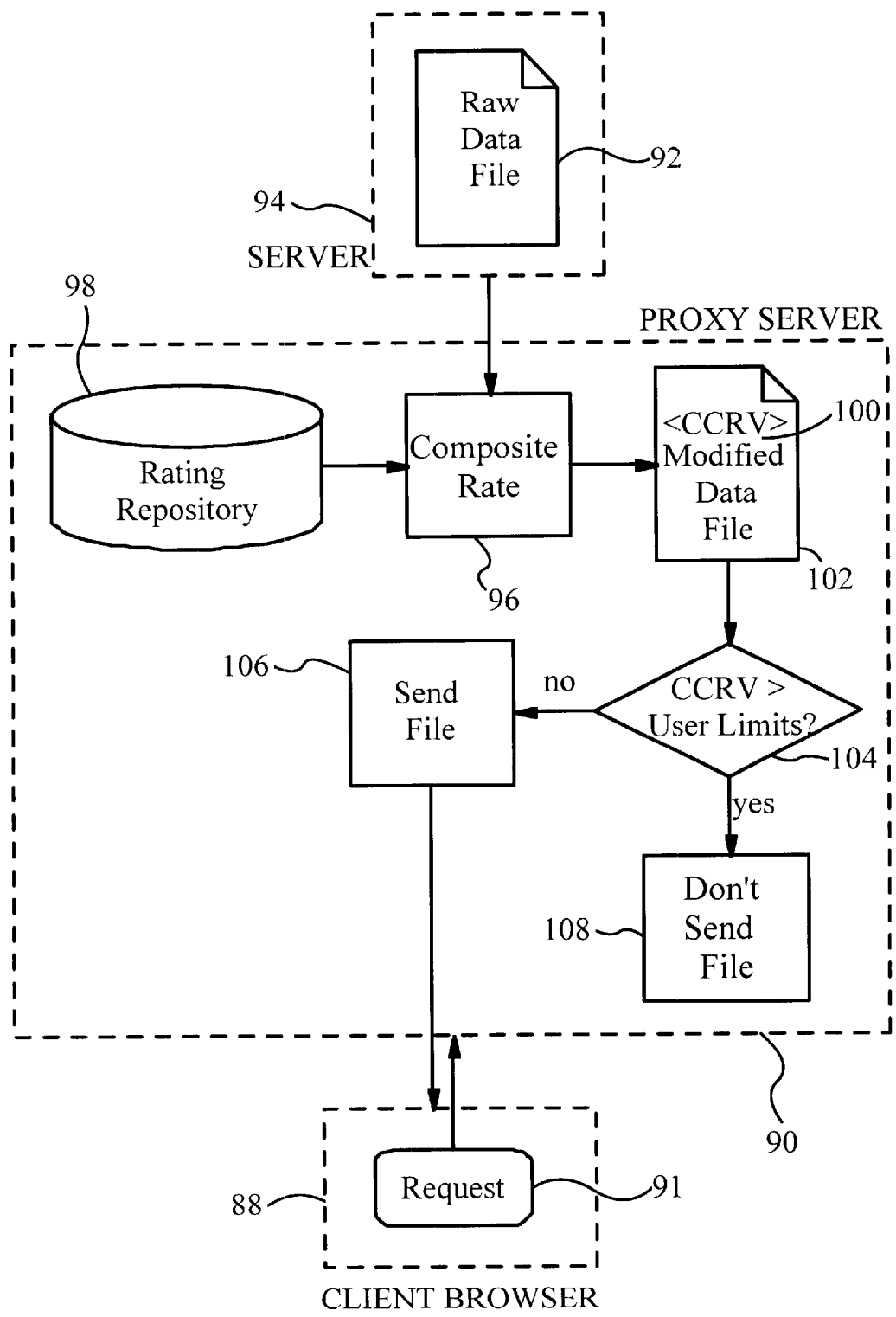
FIG. 4B is a schematic diagram of a system architecture implementing the present invention in a proxy server.

Referring to FIG. 4B, a client browser 88 accesses the internet through a proxy server 90 that stores the preset user limit values. When the user sends a request 91 for a raw data file 92 stored in server 94, proxy server 90 performs comparison step 96 using rating repository 98 to calculate a CCRV 100 and create a modified data file 102. CCRV 100 is compared in step 104 with the stored user limit values. Depending on the result, proxy server 90 either 106 sends the file or 108 does not send the file, instead sending a replacement document explaining why access was denied.

EXAMPLE 3

BATCH RATING

RSAC or another organization implements the current invention on a server. The RSAC server visits other servers, on its own initiative or in response to requests, rates all of the documents, and inserts ratings tags into the documents.

EXAMPLE 4

CLIENT FILTERS

Figure 4C:
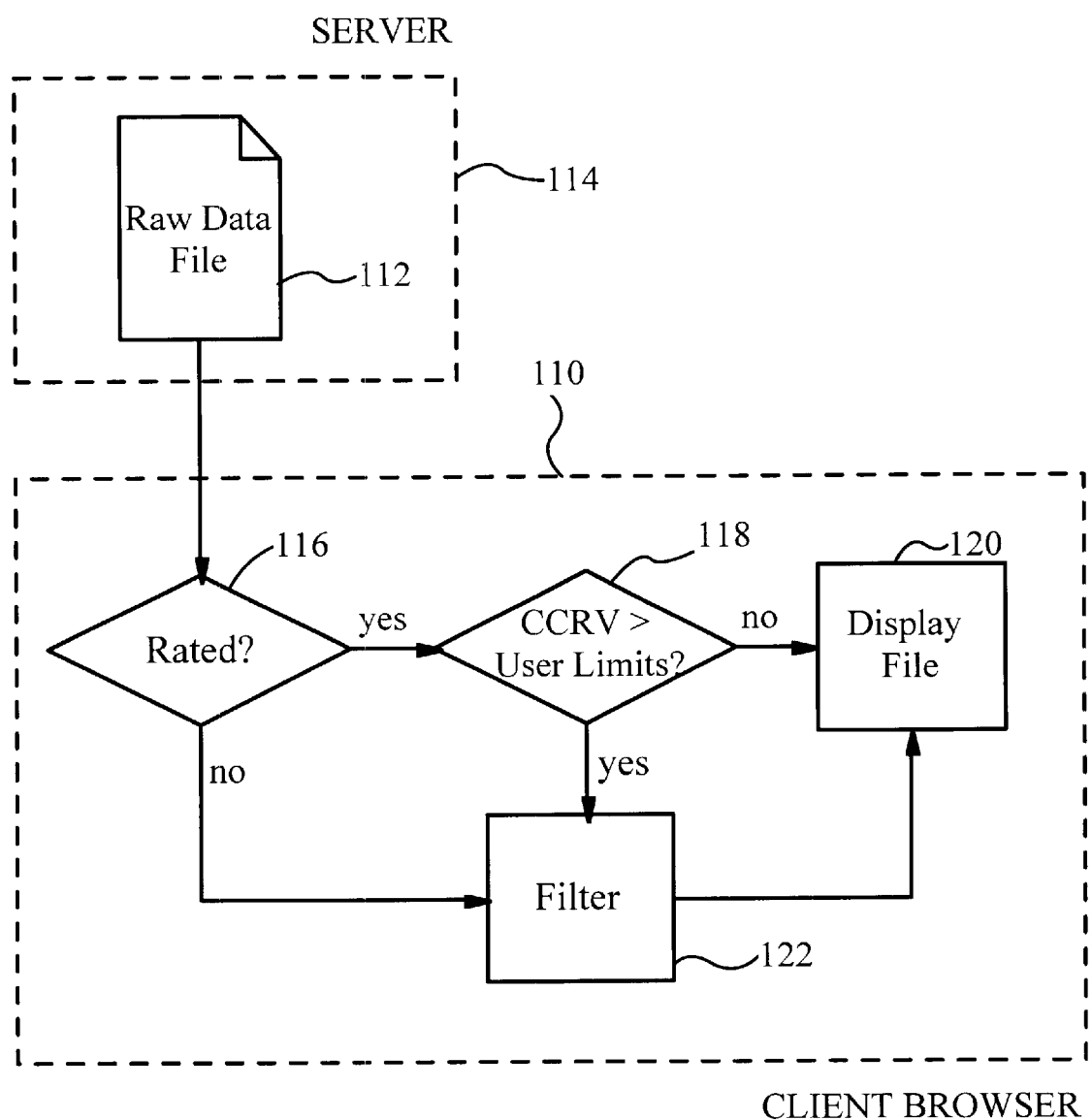
FIG. 4C is a schematic diagram of a system architecture implementing the present invention in a client.

As shown in FIG. 4C, a client browser 110 requests a raw data file 112 from a server 114. File 112 has either been rated as in Example 1 or not. Client browser 110 searches 116 for a rating and compares 118 the rating with user limit values. If the CCRV is below the user limit values, the browser displays the document, step 120. Otherwise, it filters 122 the document and displays 120 the resulting document. If the document arrives from the server without a rating, the browser immediately filters 122 the document.

EXAMPLE 5

PROXY SERVER FILTERS

This embodiment is similar to Example 2, except that the proxy server uses the stored preset user limit values to filter the document, rather than just rate it.

EXAMPLE 6

SEARCH ENGINE COMPOSITE RATES

Figure 4D:
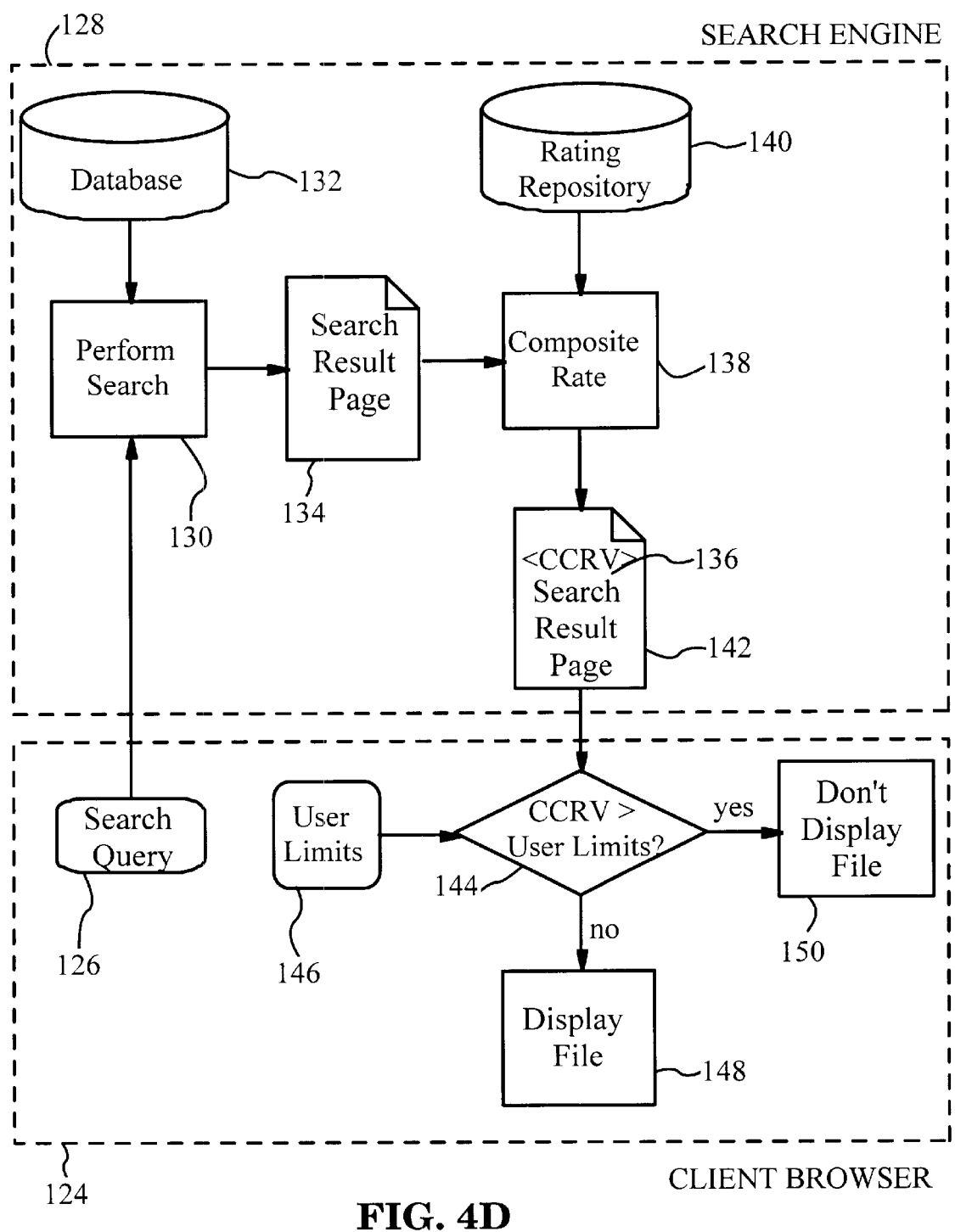
FIG. 4D is a schematic diagram of a system architecture in which a search engine implements the present invention.

As shown in FIG. 4D, a client browser 124 sends a search query 126 to a search engine 128. To perform search step 130, search engine 128 retrieves the relevant documents from its database 132 and creates a search result page 134, to which it assigns a CCRV 136 in a comparison step 138 using a rating repository 140. CCRV 136 is added to search result page 134 to create a modified search result page 142. Client browser 124 compares 144 modified search result page 142 with preset user limit values 146, and then either does 148 or does not 150 display modified search result page 142. Alternately, client browser 124 filters modified search result page 142.

EXAMPLE 7

SEARCH ENGINE FILTERS

Figure 4E:
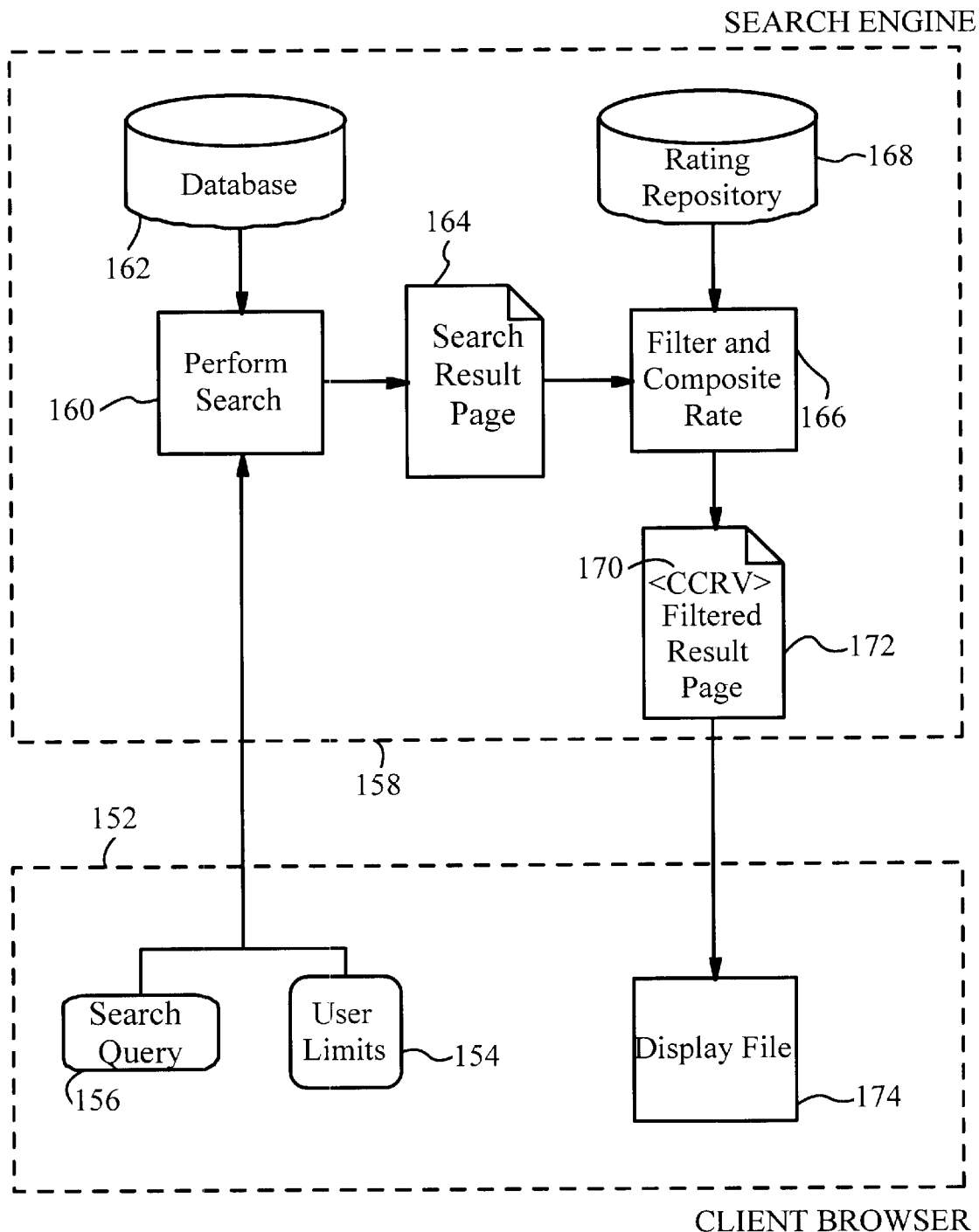
FIG. 4E is a schematic diagram of a system architecture in which a search engine filters a search result page.

Referring to FIG. 4E, client browser 152 sends present user limit values or content settings 154 along with a search query 156 to a search engine 158. Search engine 158 performs a search 160 of its database 162 to create a search result page 164. In step 166, it filters and composite rates page 164 based on content settings 154 and rating repository 168. Search engine 158 adds a CCRV 170 to the filtered page to create a modified search result page 172 that it sends to client browser 152. Because the filtering process is based on user limits 154, CCRV 170 is necessarily below user limits 154, and modified search result page 172 will be displayed in step 174. CCRV 170 is necessary because client browser 152 may be set not to display unrated pages.

It will be clear to one skilled in the art that the above embodiment may be altered in many ways without departing from the scope of the invention. Accordingly, the scope of the invention should be determined by the following claims and their legal equivalents.

What is claimed is:

1. In a distributed computer system, a computer-implemented method for automatic rating a raw data file for objectionable content, wherein said raw data file is a hypermedia file, a text file, an audio file, or an image file, said method comprising the steps of:

preprocessing said raw data file to create semantic units representative of semantic contents of said raw data file;

comparing said semantic units with a content rating repository comprising semantic entries and corresponding content ratings;

assigning content rating vectors to said semantic units based on said comparing step; and creating a modified data file incorporating rating information derived from said content rating vectors, wherein when said raw data file is an audio file and said modified data file is a modified audio file, said preprocessing step further comprising the steps of:

using a voice recognition system to create text data from said audio file;

creating an audio-to-text correlation between a location in said text data and a corresponding location in said audio file; and parsing said text data into said semantic units.

2. The computer-implemented method of claim 1 wherein said step of creating a modified data file comprises the steps of:

deriving a composite content rating vector for said raw data file from said content rating vectors; and combining said composite content rating vector with said raw data file to produce said modified data file.

3. The computer-implemented method of claim 2 wherein said composite content rating vector comprises a set of components, wherein each component in said set of components is derived from corresponding components of said content rating vectors.

4. The computer-implemented method of claim 3 wherein each component of said composite content rating vector is a weighted average of said corresponding components of said content rating vectors, said weighted average including weighting factors related to values of said corresponding components of said content rating vectors.

5. The computer-implemented method of claim 3 wherein each component of said composite content rating vector is equal to a selected value of said corresponding components of said content rating vectors, wherein said selected value is a highest of said corresponding components of said content rating vectors and said selected value has at least a predetermined minimum number of occurrences.

6. The computer-implemented method of claim 2 wherein said method occurs in a server.

7. The computer-implemented method of claim 2 wherein said raw data file is stored in a server and said method occurs in a proxy server.

8. The computer-implemented method of claim 2 wherein said raw data file is stored in a server and said method occurs in a client.

9. The computer-implemented method of claim 1 wherein said step of creating a modified data file comprises the steps of:

comparing said content rating vectors with preset user limit values to identify objectionable semantic units, wherein said preset user limit values define objectionable content rating vectors; and replacing objectionable content corresponding to the identified objectionable semantic units in a copy of said raw data file with display blocks to produce said modified data file.

10. The computer-implemented method of claim 9 wherein said raw data file is a file chosen from the group consisting of text, audio, and image.

11. The computer-implemented method of claim 9 wherein said raw data file is stored in a server and said method occurs in a client.

12. The computer-implemented method of claim 9 wherein said preset user limit values are stored in a client and said method occurs in a server.

13. The computer-implemented method of claim 9 wherein said preset user limit values are stored in a client, said raw data file is stored in a server, and said method occurs in a proxy server.

14. The computer-implemented method of claim 9, wherein said step of creating a modified data file further comprises the steps of:

deriving a modified composite content rating vector for said modified data file from a modified set of content rating vectors, wherein said modified set of content rating vectors does not contain content rating vectors corresponding to said objectionable semantic units; and storing said modified composite content rating vector in said modified data file.

15. The computer-implemented method of claim 14 wherein said preset user limit values are stored in a client and said method occurs in a server.

16. The computer-implemented method of claim 14 wherein said preset user limit values are stored in a client, said raw data file is stored in a server, and said method occurs in a proxy server.

17. The computer-implemented method of claim 1 wherein said step of creating a modified audio file comprises the steps of:

comparing said content rating vectors with preset user limit values to identify objectionable semantic units, wherein said preset user limit values define objectionable content rating vectors;

using said audio-to-text correlation to locate objectionable portions of said audio file corresponding to the identified objectionable semantic units; and replacing said objectionable portions in a copy of said audio file with audio blanking signals to produce said modified audio file.

18. The computer-implemented method of claim 17 wherein said audio file is stored in a server and said method occurs in a client.

19. The computer-implemented method of claim 17 wherein said preset user limit values are stored in a client and said method occurs in a server.

20. The computer-implemented method of claim 17 wherein said preset user limit values are stored in a client, said audio file is stored in a server, and said method occurs in a proxy server.

21. The computer-implemented method of claim 1 wherein said raw data file is an image file, said modified data file is a modified image file, said semantic units are discrete objects in regions within said image file, and said preprocessing step is performed by an image processing system.

22. The computer-implemented method of claim 21 wherein said step of creating a modified image file comprises the steps of:

comparing said content rating vectors with preset user limit values to identify objectionable discrete objects, wherein said preset user limit values define objectionable content rating vectors; and replacing objectionable content corresponding to the identified objectionable discrete objects in a copy of said image file with image blocks to produce said modified image file.

23. The computer-implemented method of claim 22 wherein said image file is stored in a server and said method occurs in a client.

24. The computer-implemented method of claim 22 wherein said preset user limit values are stored in a client and said method occurs in a server.

25. The computer-implemented method of claim 22 wherein said preset user limit values are stored in a client, said image file is stored in a server, and said method occurs in a proxy server.

26. A method for automatic rating and filtering in a network environment a raw data file for objectionable content, wherein said raw data file is a hypermedia file, a text file, an audio file, or an image file, said method comprising the steps of:

preprocessing said raw data file to create semantic units representative of semantic contents of said raw data file, wherein if said raw data file is an audio file said preprocessing step farther comprises the steps of:

using a voice recognition system to create text data from said audio file;

creating an audio-to-text correlation between a location in said text data and a corresponding location in said audio file; and parsing said text data into said semantic units; and wherein if said raw data file is an image file said semantic units are discrete objects in regions within said image file and said preprocessing step is performed by an image processing system;

comparing said semantic units with a content rating repository comprising semantic entries and corresponding content ratings;

assigning content rating vectors to said semantic units based on said comparing step; and creating a modified data file incorporating rating information derived from said content rating vectors.

27. The method of claim 26, wherein said step of creating a modified data file further comprises the steps of:

deriving a composite content rating vector for said raw data file from said content rating vectors, wherein said composite content rating vector comprises a set of components each of which is derived from corresponding components of said content rating vectors; and combining said composite content rating vector with said raw data file to produce said modified data file.

28. The method of claim 27, wherein each component of said composite content rating vector is a weighted average of said corresponding components of said content rating vectors, said weighted average including weighting factors related to values of said corresponding components of said content rating vectors.

29. The method of claim 27, wherein each component of said composite content rating vector is equal to a selected value of said corresponding components of said content rating vectors, and wherein said selected value is the highest of said corresponding components of said content rating vectors and said selected value has at least a predetermined minimum number of occurrences.

30. The method of claim 26, wherein said method occurs in a server.

31. The method of claim 26, wherein said raw data file is stored in a server and said method occurs in a proxy server.

32. The method of claim 26, wherein said raw data file is stored in a server and said method occurs in a client.

33. The method of claim 26, wherein said step of creating a modified data file comprises the steps of:

comparing said content rating vectors with preset user limit values to identify objectionable semantic units, wherein said preset user limit values define objectionable content rating vectors; and replacing objectionable content corresponding to the identified objectionable semantic units in a copy of said raw data file with display blocks to produce said modified data file.

34. The method of claim 33, wherein said preset user limit values are stored in a client and said method occurs in a server.

35. The method of claim 33, wherein said preset user limit values are stored in a client, said raw data file is stored in a server, and said method occurs in a proxy server.

36. The method of claim 33, wherein said step of creating a modified data file further comprises the steps of:

deriving a modified composite content rating vector for said modified data file from a modified set of content rating vectors, wherein said modified set of content rating vectors does not contain content rating vectors corresponding to said objectionable semantic units; and storing said modified composite content rating vector in said modified data file.

37. The method of claim 26, wherein said raw data file is an audio file and said modified data file is a modified audio file, said step of creating a modified data file further comprises the steps of:

comparing said content rating vectors with preset user limit values to identify objectionable semantic units, wherein said preset user limit values define objectionable content rating vectors;

using said audio-to-text correlation to locate objectionable portions of said audio file corresponding to the identified objectionable semantic units; and replacing said objectionable portions in a copy of said audio file with audio blanking signals to produce said modified audio file.

38. The method of claim 37, wherein said audio file is stored in a server and said method occurs in a client.

39. The method of claim 37, wherein said preset user limit values are stored in a client and said method occurs in a server.

40. The method of claim 37, wherein said preset user limit values are stored in a client, said audio file is stored in a server, and said method occurs in a proxy server.

41. The method of claim 26, wherein said raw data file is an image file and said modified data file is a modified image file, said step of creating a modified data file further comprises the steps of:

comparing said content rating vectors with preset user limit values to identify objectionable discrete objects, wherein said preset user limit values define objectionable content rating vectors; and replacing objectionable content corresponding to the identified objectionable discrete objects in a copy of said image file with image blocks to produce said modified image file.

42. The method of claim 41, wherein said image file is stored in a server and said method occurs in a client.

43. The method of claim 41, wherein said preset user limit values are stored in a client and said method occurs in a server.

44. The method of claim 41, wherein said preset user limit values are stored in a client, said image file is stored in a server, and said method occurs in a proxy server.

* * * * *